US012755449B2

(12) United States Patent
Kim

(10) Patent No.: US 12,755,449 B2
(45) Date of Patent: Oct. 6, 2026

(54) METHOD FOR GENERATING TRAINING IMAGE USED TO TRAIN IMAGE-BASED ARTIFICIAL INTELLIGENCE MODEL FOR ANALYZING IMAGES OBTAINED FROM MULTI-CHANNEL ONE-DIMENSIONAL SIGNALS, AND DEVICE PERFORMING SAME

(71) Applicant: SEOUL NATIONAL UNIVERSITY HOSPITAL, Seoul (KR)

(72) Inventor: Joonghee Kim, Seongnam-si (KR)

(73) Assignee: SEOUL NATIONAL UNIVERSITY HOSPITAL, Seoul (KR)

( * ) Notice: Subject to any disclaimer, the term of this patent is extended or adjusted under 35 U.S.C. 154(b) by 121 days.

(21) Appl. No.: 18/715,683

(22) PCT Filed: Dec. 2, 2022

(86) PCT No.: PCT/KR2022/019544
§ 371 (c)(1),
(2) Date: Aug. 2, 2024

(87) PCT Pub. No.: WO2023/101526
PCT Pub. Date: Jun. 8, 2023

(65) Prior Publication Data

US 2025/0022191 A1 Jan. 16, 2025

(30) Foreign Application Priority Data

Dec. 3, 2021 (KR) ........................ 10-2021-0172351
Dec. 1, 2022 (KR) ........................ 10-2022-0166146

(51) Int. Cl.
*G06T 11/20* (2026.01)

(52) U.S. Cl.
CPC .......... *G06T 11/20* (2013.01); *G06T 2210/32* (2013.01)

(58) Field of Classification Search
CPC ............................ G06T 11/20; G06T 2210/32
(Continued)

(56) References Cited

U.S. PATENT DOCUMENTS

2004/0051721 A1* 3/2004 Ramseth ................ G16H 40/63
345/689
2016/0095526 A1 4/2016 Yoshimura
(Continued)

FOREIGN PATENT DOCUMENTS

CN 107203692 B 5/2020
CN 111202512 A 5/2020
(Continued)

OTHER PUBLICATIONS

David Belo et al., "Biosignals learning and synthesis using deep neural networks," BioMedical Engineering OnLine, 2017, vol. 16, No. 115.

*Primary Examiner* — Jin Ge
(74) *Attorney, Agent, or Firm* — Hyeon Seok Chang

(57) ABSTRACT

In an aspect, exemplary embodiments of the present disclosure provide a training image generation method and device that can generate training images in large quantity by varying image formats and signal patterns to solve the problems that are generated when two-dimensional image training is performed using only one format without considering variety of formats, for example, a technology for generating training images that are used to training an image-based artificial intelligence model for analyzing images obtained from multi-channel one-dimensional signals, and a method and device for performing the technology.

25 Claims, 8 Drawing Sheets

(58) Field of Classification Search
USPC .......................................................... 345/619
See application file for complete search history.

(56) References Cited

U.S. PATENT DOCUMENTS

| | | | | |
|---|---|---|---|---|
| 2018/0333063 | A1* | 11/2018 | Muchhala .............. | A61B 5/243 |
| 2019/0374166 | A1* | 12/2019 | Charles ................ | A61B 5/7264 |
| 2020/0178825 | A1 | 6/2020 | Lu et al. | |
| 2022/0323017 | A1* | 10/2022 | Eger ................... | A61M 16/024 |
| 2023/0165505 | A1* | 6/2023 | Babaeizadeh ........ | A61B 5/0006<br>600/509 |
| 2023/0293079 | A1* | 9/2023 | Chen ...................... | G06V 10/25 |
| 2023/0388520 | A1 | 11/2023 | Krummen et al. | |

FOREIGN PATENT DOCUMENTS

| | | | | | |
|---|---|---|---|---|---|
| CN | 112329609 | A | * | 11/2020 | ............... G06K 9/00 |
| CN | 113197583 | A | | 8/2021 | |
| JP | H06-282060 | A | | 10/1994 | |
| JP | 2020-130772 | A | | 8/2020 | |
| JP | 2020-191050 | A | | 11/2020 | |
| JP | 6831944 | B1 | | 2/2021 | |
| WO | 2017/182622 | A1 | | 10/2017 | |
| WO | 2021/218943 | A1 | | 11/2021 | |

* cited by examiner

METHOD FOR GENERATING TRAINING IMAGE USED TO TRAIN IMAGE-BASED ARTIFICIAL INTELLIGENCE MODEL FOR ANALYZING IMAGES OBTAINED FROM MULTI-CHANNEL ONE-DIMENSIONAL SIGNALS, AND DEVICE PERFORMING SAME

TECHNICAL FIELD

Embodiments relate to a technology of generating a training image, that is, a technology for generating a training image used to train an image-based artificial intelligence model for analyzing images obtained from multi-channel one-dimensional signals, for example, the technology being able to generate training images in large quantity by varying signal patterns, and a device performing the technology.

BACKGROUND ART

Signals such as bio signals including electrocardiogram and electroencephalogram are usually measured in the form of a one-dimensional signal. Signals that are measured in this case are implemented as numerical values on a time domain that is measured at a corresponding channel and are generally expressed as a numerical array structure of a C×T type. Measured numerical values are stored and used in the numerical array structure described above.

Since it is difficult for human readers to understand such signal data numerical values as they are, they are output on a two-dimensional image, in which waveforms of a type that is easy to be understood by human are drawn for respective channels, on paper or the screen of a device.

However, two-dimensional images can be output in various output formats. In particularly, even though two-dimensional images that are used for the same purpose are output, the formats may be very different depending on products.

Let's assume developing an artificial intelligence model that analyzes signal information resulting from output of a two-dimensional image. If the artificial intelligence model is trained using training images of one output format, the artificial intelligence model cannot analyze target images of other output formats, resulting in low analysis performance.

Accordingly, it is required to prepare training images of as various output formats as possible in order to train an artificial intelligence model such that the artificial intelligence model has high analysis performance. However, it is practically difficult to prepare many training images for sufficient training from only existing images that existing products currently use. In particular, there is a limitation that it is impossible to prepare for variation in the future in which images of new output formats will be used due to release of new products or update of existing products.

Summary of Invention

Technical Problem

In an aspect, exemplary embodiments of the present disclosure provide a training image generation method and device that can generate training images in large quantity by varying image formats and signal patterns to solve the problems that are generated when two-dimensional image training is performed using only one format without considering variety of formats, for example, a technology for generating training images that are used to training an image-based artificial intelligence model for analyzing images obtained from multi-channel one-dimensional signals, and a method and device for performing the technology.

Solution to Problem

Embodiments of the present disclosure provides a method for generating a training image used to train an image-based artificial intelligence model for analyzing images obtained from multi-channel one-dimensional signals, the method being performed by a computing device including a processor and a memory, comprising: generating a training signal on the basis of source signal information including multi-channel one-dimensional signals; selecting at least one output format among a plurality of preset output formats to determine an output format of the training image; determining an output section for each channel of the training signal on the basis of a length of a time section of a waveform of the determined output format; selecting a per-axis scale to determine a grid scale of the training image; drawing a grid pattern on a two-dimensional plane in accordance with the determined grid scale; setting a reference position of a waveform content of the training signal on the basis of at least one of the determined output section for each channel or the determined grid scale; and drawing the waveform content of the training image and a signal marker on the two-dimensional plane with the grid pattern drawn thereon, and provides a computer-readable recording medium recording a program for performing the method or a computer program stored on a computer-readable recording medium.

Further, embodiments of the present disclosure provide a device for generating a training image, including: an obtaining unit configured to obtain a source signal; and an image generating unit including a processor and a memory, wherein the image generating unit receives source signal information received by the obtaining unit and performs the method for generating training images described above.

Advantageous Effects of Invention

In an aspect, according to embodiments of the present disclosure, it is possible to supply a training data set that is used to develop an artificial intelligence analyzing two-dimensional images with high performance by generating two-dimensional signal images of various formats from source signals such as multi-channel one-dimensional signals.

By using the two-dimensional signal images of various formats, it is possible to solve the problem that are generated when only one format is learned without considering such variety of format, for example, the problem of out-of-distribution and the problem that wrong analysis is output even when a format is changed only a little.

The present disclosure can be applied not only to analysis of signals in the medical/biological field, but extensively to signal analysis in other industrial fields that analyze two-dimensional images on the basis of one-dimensional signals.

The effects of the present disclosure are not limited to those described above and other effects not stated herein may be made apparent to those skilled in the art from the claims.

BRIEF DESCRIPTION OF DRAWINGS

In order to more clearly describe exemplary embodiments of the present disclosure, drawings for description of the embodiments are briefly introduced below. The following drawings should be understood as being provided only for describing the embodiments of the present disclosure rather than limiting the present disclosure. Further, various modifications such as exaggeration and omission may be applied to some components shown in the following drawings for clarity of description.

DESCRIPTION OF EMBODIMENTS

Figure 1:
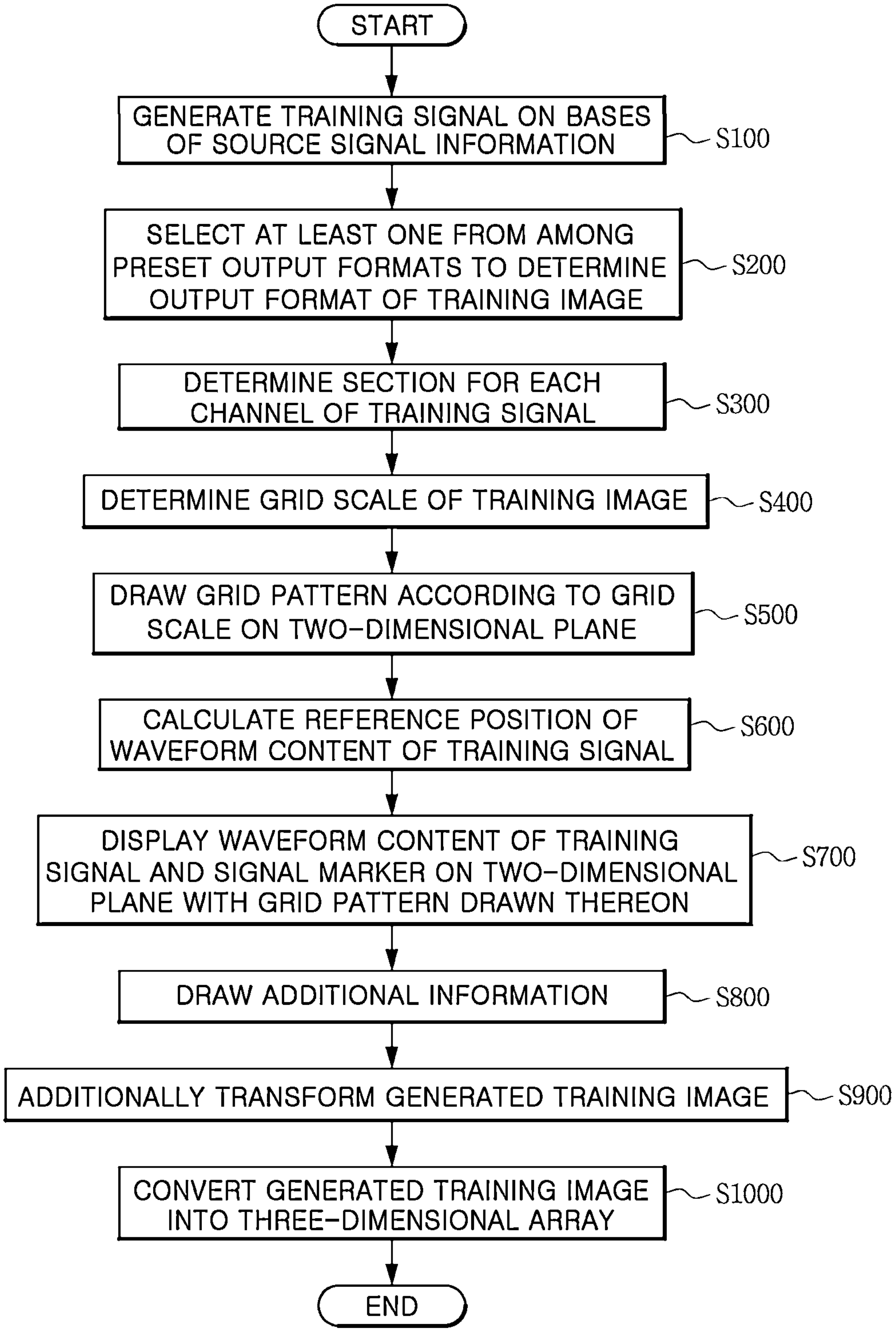
FIG. 1 is a flowchart of a method for generating a training image used to train an image-based artificial intelligence model for analyzing images obtained from multi-channel one-dimensional signals according to an aspect of the present disclosure.

Hereinafter, some embodiments of the present disclosure are described in detail with reference to exemplary drawings. When reference numerals are given to the components in the drawings, the same components may be given the same reference numerals even though they are shown in different drawings. Further, in describing the present disclosure, well-known functions or constructions may not be described in detail when it is determined they may unnecessarily obscure the spirit of the present disclosure.

When terms “include”, “have”, and “composed of” are used herein, other components may be added unless “only” is used. When a component is described in a singular form, the component may include plural unless specifically stated.

Further, terms “first”, “second”, “A”, “B”, “(a)”, and “(b)” can be used in the following description of the components of the present disclosure. These terms are provided only for discriminating components from other components, and the essence, sequence, order, or number of the components is not limited by the terms unless stated otherwise.

In the specification, ‘learning’ is a term meaning that machine learning is performed through computing according to a procedure.

In the specification, a network means a neural network of a machine learning algorithm or a model.

In the specification, terms such as “unit”, “module”, “device”, or “system” are intended to be able to mean not only hardware, but a combination of software that is driven by corresponding hardware. For example, hardware may be data processing device including a central processing unit (CPU), a graphic processing unit (GPU), or other processors. Further, software may mean a process in execution, an object, an executable file, a thread of execution, a program, etc.

In this specification, multi-channels mean one or more channels rather than excluding the case of one channel.

In specific embodiments, the method for generating a training image used to train an image-based artificial intelligence model for analyzing images obtained from multi-channel one-dimensional signals can be performed by a computing device including at least one processor and a memory.

The computing device is configured to receive signal data from an external device (e.g., a signal measurement apparatus) and process the signal data.

FIG. 1 is a flowchart of a method for generating a training image used to train an image-based artificial intelligence model for analyzing images obtained from multi-channel one-dimensional signals according to an aspect of the present disclosure.

Referring to FIG. 1, the method for generating a training image (hereafter, a training image generation method) includes a step of generating/modulating a training signal on the basis of source signal information (S100).

Figure 2:
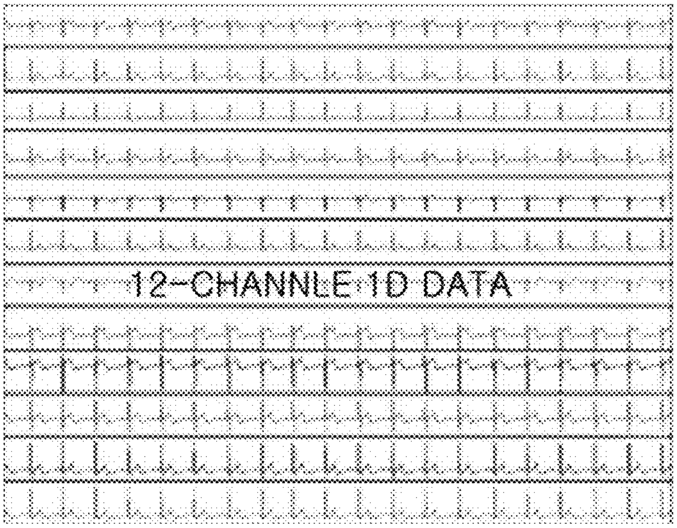
FIG. 2 is a schematic diagram of source signal information according to an embodiment of the present disclosure.
Figure 3:
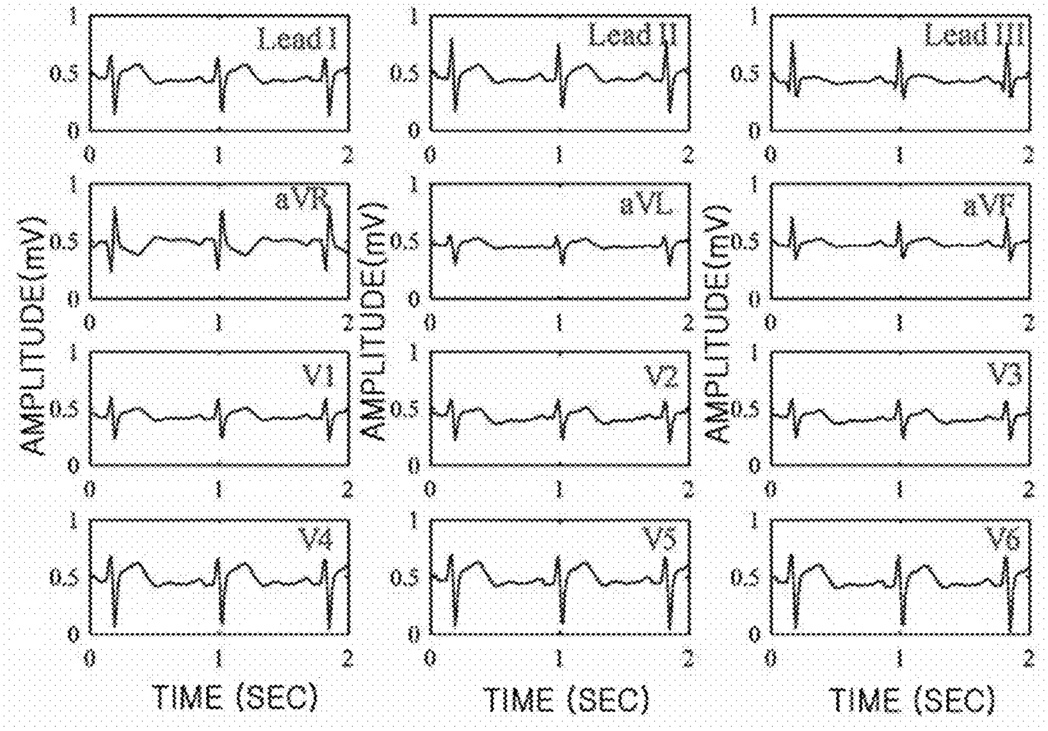
FIG. 3 is a schematic diagram of training signals according to an embodiment of the present disclosure.

FIG. 2 is a schematic diagram of source signal information according to an embodiment of the present disclosure, and FIG. 3 is a schematic diagram of training signals according to an embodiment of the present disclosure.

Referring to FIG. 2, the source signal information may include a one-dimensional signal for each channel measured through one or more channels mounted on the body of a subject. For example, a source signal that is input may be an array of a channel×time (C×T) type. The source signal may have a numerical array. As shown in FIG. 2, the source signal may be composed of twelve one-dimensional electrocardiogram signals measured through twelve lead channels.

The source signal information may include an analog source signal and a measurement value of the source signal (e.g., a digital value).

Further, the source signal information may further include source additional information other than a signal such as subject information (identification information, age, sex, reading information, etc.) of a source signal, a source scale marker, a source channel marker, a source grid scale, etc.

Such a source signal is used as a source for generating a training signal. A plurality of training signals may be generated from a single source signal.

In an embodiment, the step S100 may include: a step of selecting at least one transform function among a plurality of preset transform functions; and a step of transforming the source signal into a training signal using the selected transform function.

A transform function is a function that transforms an input signal into another signal. Such signal transform may be handled as a preprocessing process of a training image generation process. The transform function, for example, may be a signal preprocessing function that has its purpose in removing various types of noise or randomly changing an input signal.

A plurality of transform functions is each composed of one or more transform elements that perform a transform function. In some embodiments, the transform element may show transforming the signal attribute of an input signal. One or more transform elements respectively constituting n (n is a natural number of 1 or more) transform functions ($f_n^1$) are defined and stored in advance. For reference, the subscript ‘n’ is a character showing that there are n functions and the superscript is a number for discriminating from other functions to be described below.

In specific embodiments, a transform element vector ($P_n^1$) of the transform function ($f_n^1$) may include m factors and each of the factors is expressed as a transform element ($p_{nm}^1$) (here, n is a transform function identifier and m is an element identifier). The transform elements ($p_{nm}^1$) each may correspond to a unique input information processing attribute. When a signal is input to the transform function ($f_n^1$), each transform element ($p_{nm}^1$) becomes a setting value of a signal processing attribute and the signal is transformed. For example, when the transform function ($f_n^1$) is a noise removal function, the transform element ($p_{nm}^1$) corresponds to a signal processing attribute that determines (sets) a certain characteristic of noise removal work.

The signal processing attribute may include, for example, manners of processing, changing, or removing (replacing the signal magnitude with a fixed numerical value such as 0) the magnitude, the waveform, the frequency range, the frequency distribution, the start point in time, the time range of the signal, and/or other signal attributes. Further, these may be performed on each channel or may be equally applied to channel groups or all of channels.

In specific embodiments, the transform element of the transform function may be implemented as a hyperparameter. When one transform function includes a plurality of transform elements, the transform elements can be expressed as hyperparameter vectors. In this case, vector values are the values of the transform elements. Accordingly, each transform function may be associated with its hyperparameter vector.

It may be possible to generate a training signal using such transform functions (S100). Each of a plurality of transform functions ($f_n^1$) may generate a signal $X'=f_n^1(X, P_{nm}^1)$ by receiving and transforming a source signal (e.g., an electrocardiogram signal, X) (S100). Further, when the value of a transform element is changed, the signal attribute is implemented as a changed value in a corresponding manner, whereby a signal with a changed signal attribute is finally generated (S100).

In an embodiment, the step of selecting at least one transform function may select any one transform function among a plurality of transform functions or select two or more transform functions among a plurality of transform functions, depending on a 1-1 probability distribution set in advance for a set of the plurality of transform functions.

The 1-1 probability distribution defines the probability of selecting specific transform function(s) to generate a training image among all of a plurality of transform functions.

In an embodiment, the 1-1 probability distribution may be defined as a manner of selecting one transform function among n pieces. For example, the 1-1 probability distribution may have also a multinomial distribution. In this case, a source signal is transformed through a single step.

In another embodiment, the 1-1 probability distribution may be defined as a manner of selecting two or more transform functions among n pieces. For example, the 1-1 probability distribution may have a binomial distribution. In this case, different items of transformation may be redundantly selected and used to generate a training signal. Then, a source signal is transformed through multiple steps using a plurality of selected transform functions.

In alternative embodiments, the 1-1 probability distribution may have been optimized by training a certain designated initial probability distribution. This will be described in more detail below.

A selected transform function may be directly used, or it may be possible to generate a training signal by changing the value of a transform element of a selected transform function (S100). A selected transform function may receive a new value for at least one transform element as an input factor, whereby the function of the transform function may be adjusted.

In an embodiment, the step of changing the source signal into a training signal using a selected transform function may include: a step of changing at least one transform element value among transform elements constituting the selected transform function into a new value; and a step of generating a signal, to which a signal attribute changed in accordance with the changed transform element value has been applied, into a training signal. Changing the value of a transform element may be performed on the basis of a probability distribution.

In an embodiment, a 1-2 probability distribution may be set for each transform element. When there are m transform elements, m 1-2 probability distributions are defined and allocated. For each of the transform elements of a transform function selected in accordance with the 1-1 probability distribution, the existing transform element value may be changed into a new value selected in accordance with a 1-2 probability distribution set in advance for itself. New changed values are applied to a source signal, whereby a new training signal is generated.

The 1-2 probability distribution defines a probability distribution in which individual values will be designated in the entire range of values that transform elements of a transform function can have. In specific embodiments, the 1-2 probability distribution may include a Gaussian (normal) distribution, a gamma distribution, an exponential distribution, a uniform distribution, and a chi-squared distribution as continuous probability distributions, a binomial distribution, a negative binomial distribution, a hypergeometric distribution, and a Poisson distribution as discrete probability distributions, and a multinomial distribution and/or multivariate distributions for a plurality of transform elements. A same 1-2 probability distribution or different 1-2 probability distributions may be set for each transform element. Further, other than a parametric method of extracting a transform element with a probability distribution defined in the specific types described above, it may be possible to randomly extract a transform element even without assuming a specific distribution.

In an embodiment, when a transform element is implemented as numerical data, the 1-2 probability distribution may be a Gaussian (normal) distribution, a gamma distribution, an exponential distribution, a uniform distribution, and a chi-squared distribution that are continuous probability distributions. Then, a new value of the transform element is a value selected from the continuous probability distributions.

In an embodiment, when a transform element is implemented as binary variable data, the 1-2 probability distribution may be a binomial distribution, a negative binomial distribution, a hypergeometric distribution, and a Poisson distribution that are discrete probability distributions. The binary variable data may be expressed as a first binary value indicating "yes" or a second binary value indicating "no". A new value of the transform element is a value selected in accordance with the discrete probability distributions.

In an embodiment, when a transform element is implemented as a categorical variable, the 1-2 probability distribution may be a multinomial probability distribution. Then, a new value of the transform element is a value selected in accordance with the multinomial probability distribution.

In some embodiments, a set of transform elements constituting a transform function may include at least some transform elements having a correlation with each other. When a transform element changed into a new value has a correlation with another transform element, the 1-2 probability distribution set for the another transform element having the correlation may be a multivariate probability distribution. Then, the value of the another transform element having the correlation is changed into a new value selected in accordance with a predefined multivariate probability distribution.

Further, as described above, other than a parametric method of extracting a transform element with a probability distribution defined in the specific types described above, it may be possible to randomly extract a transform element even without assuming a specific distribution.

In alternative embodiments, the 1-2 probability distribution may have been optimized by training a certain designated initial probability distribution. This will be described in more detail below.

As shown in FIG. 3, a portion of a generated training signal is drawn on a two-dimensional plane frame of a training image.

Referring to FIG. 1 again, the method for generating a training image includes a step of selecting at least one output format from a plurality of preset output formats to determine an output format of the training image (S200).

Figure 4:
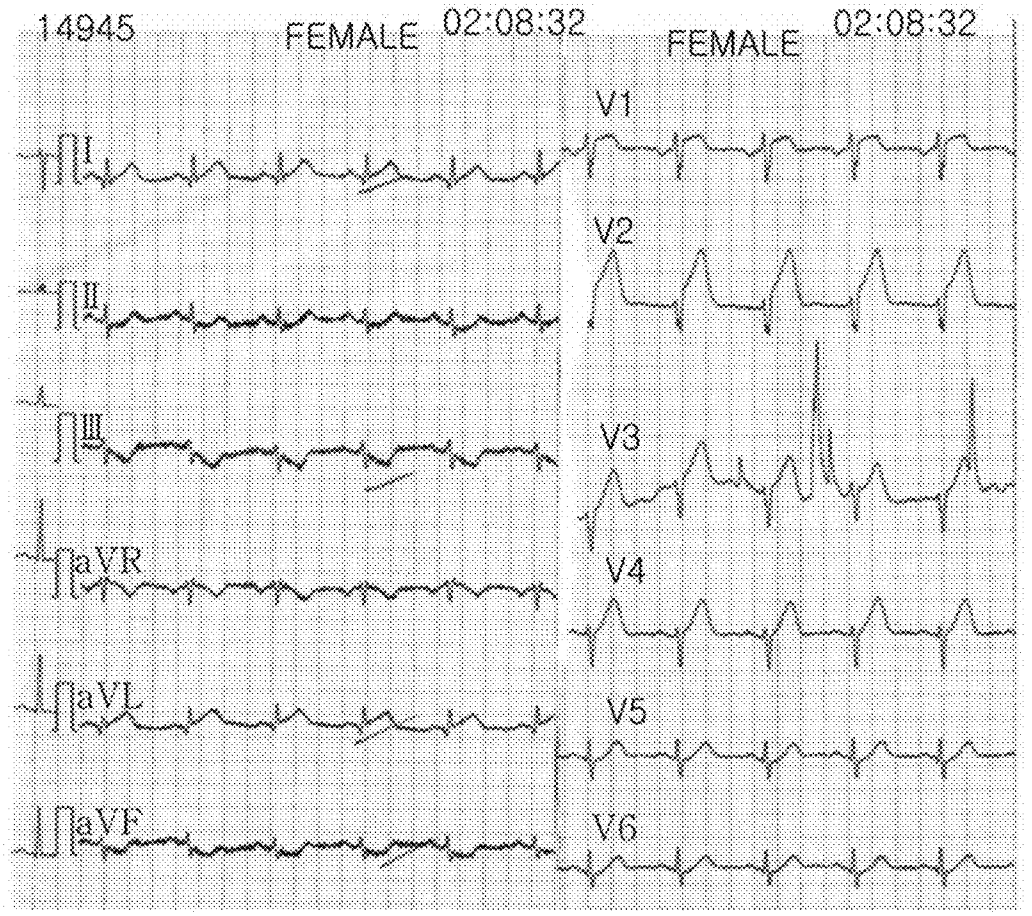
FIG. 4 is a schematic diagram of output formats according to an embodiment of the present disclosure.

FIG. 4 is a schematic diagram of output formats according to an embodiment of the present disclosure.

Referring to FIG. 4, the output formats define a structure in which output components of a training image are disposed on a two-dimensional plane frame. The plurality of output formats may be associated with output components of different aspects. In specific embodiments, a plurality of output formats may include an output format that defines the type of a waveform, an output format that defines the array position of a waveform, an output format that defines the position of a waveform display region, and/or an output format that defines the position of an additional information display region.

The type of a waveform may include a channel number.

The array position of a waveform, which shows what order and where waveforms of respective channels are disposed in, may include array order, etc.

The position of a waveform display region may include the coordinate range of the region (e.g., a grid region) in which a waveform will be displayed.

The position of an additional information display region includes the coordinate range of a region in which additional information other than a waveform will be displayed. The additional information may include object information (e.g., age, sex) of a waveform, waveform analysis, scale information of a waveform, etc.

The waveform display region and the additional information region may be discriminated from each other or may partially overlap each other.

Each of a plurality of output formats is composed of one or more format elements constituting a disposition structure of the corresponding output format. Accordingly, similar to a transform function based on transform elements, an output format can also be expressed as a function composed of format elements. One or more format elements respectively constituting n (n is a natural number of 1 or more) output format functions ($f_n^2$) are defined and stored in advance. For reference, the subscript 'n' is a character showing that there are n functions and the superscript is a number for discriminating from other functions described above and to be described below.

In specific embodiments, a format vector ($P_n^2$) of the output format function ($f_n^2$) may include m factors, and each of the factors is expressed as a format element ($p_{nm}^2$) (here, n is an output format function identifier and m is an element identifier). The format element ($p_{nm}^2$) corresponds to a disposition object defined in the corresponding output format, that is, an output component.

In an embodiment, a format element may include a channel number, a channel order, the position of a waveform display region, the position of an additional display region, the up-down gap between waveforms, the left-right gap of individual waveforms, and/or the length of a time section of a waveform, etc. For example, a format element of an output format that defines the position of a waveform display region may include the position of a waveform display region on a two-dimensional plane, etc.

When a format element has a specific value, an output element corresponding to the format element is implemented as the specific value in the corresponding output format and is expressed on a training image.

Similar to the transform function, the format elements of the output format function may be implemented as hyperparameters. When one output format function includes a plurality of transform elements, the plurality of format elements can be expressed as hyperparameter vectors. In this case, vector values are the values of the format elements. Then, each output format function may be associated with its hyperparameter vector.

In an embodiment, the step of selecting at least one output format function (S200) may select any one output format function or may select two or more output format functions among a plurality of output format functions, depending on a 2-1 probability distribution set in advance for a set of the plurality of transform functions.

The 2-1 probability distribution defines the probability of selecting specific output format function(s) to generate a training image among all of a plurality of output format functions. Selecting an output format function in accordance with the 2-1 probability distribution is similar to selecting transform in accordance with the 1-1 probability distribution.

In an embodiment, the 2-1 probability distribution may be defined as a manner of selecting one output format function from n pieces. For example, the 2-1 probability distribution may have a multinomial distribution.

In another embodiment, the 2-1 probability distribution may be defined as a manner of selecting two or more output format functions among n pieces. For example, the 2-1 probability distribution may have a binomial distribution. In this case, different output format functions may be redundantly selected and used to generate a training signal.

In alternative embodiments, the 2-1 probability distribution may have been optimized by training a certain designated initial probability distribution. This will be described in more detail below.

A selected output format may be directly used or may be determined as an output format for a training image by changing the value of a format element of the selected output format (S200). A selected output format function may receive a new value for at least one format element as an input factor, whereby the function of the output format function may be adjusted.

In an embodiment, the step of selecting at least one output format among a plurality of preset output formats to determine an output format of a training image (S200) may include: a step of changing the value of at least one format element of format elements constituting the selected output format into a new value; and a step of determining the output format having the changed value of the format element as an output format of the training image. Changing the value of a format element may be performed on the basis of a probability.

In an embodiment, a 2-2 probability distribution may be set for each format element. When there are m format elements, m 2-2 probability distributions are defined and allocated. For each of the format elements of an output format function selected in accordance with the 2-1 probability distribution, the existing format element value may be changed into a new value selected in accordance with a 2-2 probability distribution set in advance for itself. The output format having the new changed value is used to generate a training image.

The 2-2 probability distribution defines a probability distribution in which individual values will be designated in the entire range of values that format elements of an output format function can have. In specific embodiments, the 2-2 probability distribution may include a Gaussian (normal) distribution, a gamma distribution, an exponential distribution, a uniform distribution, and a chi-squared distribution as continuous probability distributions, a binomial distribution, a negative binomial distribution, a hypergeometric distribution, and a Poisson distribution as discrete probability distributions, and a multinomial distribution and/or a multivariate distribution for a plurality of transform elements. A same 2-2 probability distribution or different 2-2 probability distributions may be set for each format element. Further, other than a parametric method of extracting a format element with a probability distribution defined in the specific types described above, it may be possible to randomly extract a format element even without assuming a specific distribution.

In an embodiment, when a format element is implemented as numerical data, the 2-2 probability distribution may be a Gaussian (normal) distribution, a gamma distribution, an exponential distribution, a uniform distribution, and a chi-squared distribution that are continuous probability distributions. Then, a new value of the format element is a value selected from a continuous probability distribution.

In an embodiment, when a format element is implemented as binary variable data, the 2-2 probability distribution may be a binomial distribution, a negative binomial distribution, a hypergeometric distribution, and a Poisson distribution that are discrete probability distributions. The binary variable data may be expressed as a second binary value indicating "yes" or a second binary value indicating "no". A new value of the format element is a value selected in accordance with the discrete probability distributions.

In an embodiment, when a format element is implemented as a categorical variable, the 2-2 probability distribution may be a multinomial probability distribution. Then, a new value of the format element is a value selected in accordance with the multinomial probability distribution.

In some embodiments, a set of format elements constituting an output format function may include at least some format elements having a correlation with each other. When a format element changed into a new value has a correlation with another format element, the 2-2 probability distribution set for the another format element having the correlation may be a multivariate probability distribution. Then, the value of the another format element having the correlation is changed into a new value selected in accordance with a predefined multivariate probability distribution.

Further, as described above, other than a parametric method of extracting a format element with a probability distribution defined in the specific types described above, it may be possible to randomly extract a format element even without assuming a specific distribution.

In alternative embodiments, the 2-2 probability distribution may have been optimized by training a certain designated initial probability distribution. This will be described in more detail below.

As described above, an output format having a format element value changed in accordance with the 2-2 probability distribution is supplied as an output format for generating the training image (S200).

Referring to FIG. 1 again, the method for generating a training image includes: a step of determining an output section for each channel of a training signal on the basis of the length of the time section of the waveform of a determined output format (S300); and a step of determining a grid scale of a training image by selecting a per-axis scale (S400).

The step of determining an output section for each channel of a training signal may include: a step of selecting at least one point among a start point and an end point of an output section for each channel to be output in the training image of the entire length of a received source signal; and a step of calculating the section for each channel on the basis of the length of the time section of a waveform of format elements of a selected output format and the selected point.

In general, only some signals among all of signals that are measured are output in an image. The entire length of an output section is determined as the time section of a waveform of the format attributes of the output format determined in step S200 (S300).

The start point or the end point is determined from a range including the entire time section of a determined waveform in the entire section of a generated training signal.

The selection range of the start point may be the range from a first point of a training signal to a point extending from a final point of the training signal in the negative time direction by the time section of a waveform determined in the step S200. In an embodiment, when the entire section of a training signal is [0, Ω] and the time section of a waveform is w, the distribution of the start point may be [0, Ω-w]. In this case, the end point is a point extending from a selected start point in the positive time direction by the time section of the determined waveform.

The selection range of the end point is opposite to the selection range of the start point, that is, the selection range of the end point may be the range from a final point of a training signal to a point extending from a first point of the training signal in the positive time direction by the time section of a determined waveform. In an embodiment, the distribution of the end point may be [w, Ω]. In this case, the start point is a point extending from a selected end point in the negative time direction by the time section of the determined waveform.

In an embodiment, the start point or the end point may be a point selected in accordance with a preset third probability distribution from the selection range of each point. The third probability distribution defines a probability distribution in which an individual value will be designated in the selection range of each point.

The third probability distribution may be a Gaussian (normal) distribution, a uniform distribution, and a chi-squared distribution that are continuous probability distributions. When a start point is selected in accordance with a uniform probability distribution, etc., an end point is automatically selected, whereby an output section may be determined in a training signal.

In some embodiments, a plurality of channels may include synchronized channels in which the output sections of at least some channels coincide with each other. In some other embodiments, a plurality of channel may be non-synchronized channels of which the output sections are different.

Due to the operation of the step S300, a waveform content to be displayed on a training image in the entire section of a training signal is determined.

The step of determining a grid scale of a training image (S400) may determine a grid scale by selecting a horizontal axis unit scale or a vertical axis unit scale of a coordinate system in which the training signal will be displayed.

Figure 5:
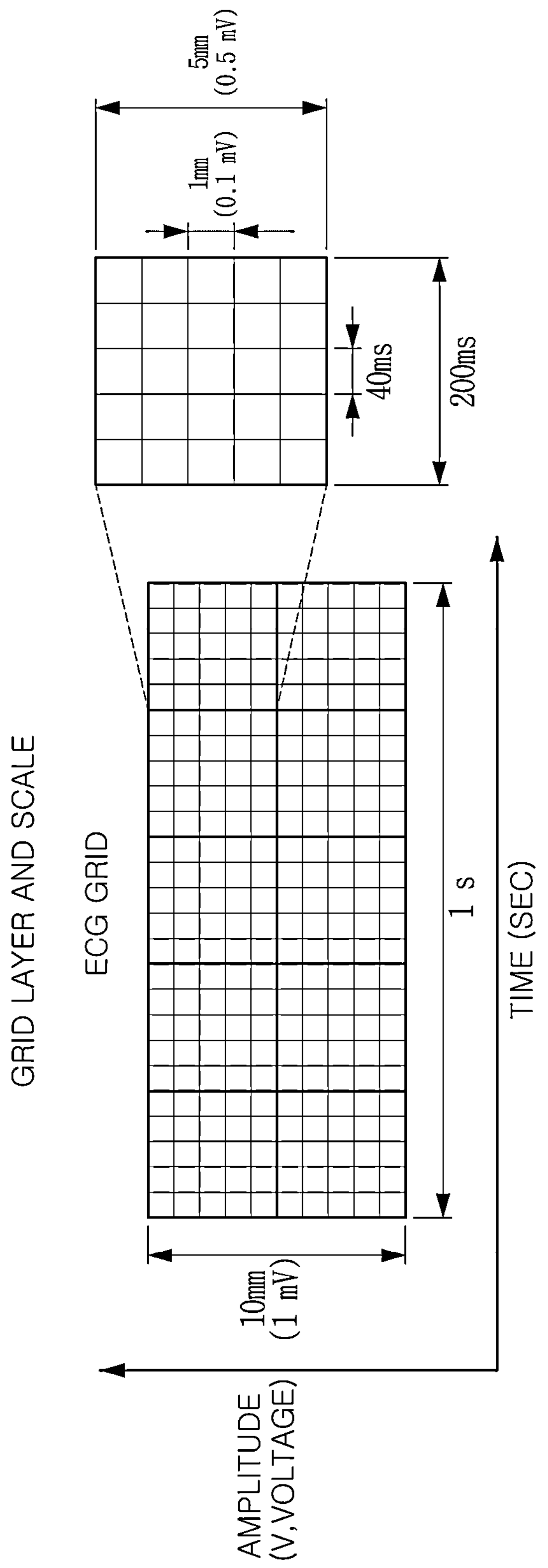
FIG. 5 is a schematic diagram of a grid scale according to an embodiment of the present disclosure.

FIG. 5 is a schematic diagram of a grid scale according to an embodiment of the present disclosure.

Referring to FIG. 5, the horizontal axis (or x axis) indicates time and the vertical axis (or y axis) indicates a signal measurement value in a grid scale.

In some embodiments, a step of selecting a horizontal axis unit scale and/or a vertical axis unit scale may include: a step of selecting any one horizontal axis unit scale among a plurality of preset horizontal axis unit scales in accordance with a 4-1 probability distribution set in advance for all of the plurality of horizontal axis unit scales; and/or a step of selecting any one vertical axis unit scale among a plurality of preset vertical axis unit scales in accordance with a 4-2 probability distribution set in advance for all of the plurality of vertical axis unit scales.

Similar to the 1-1 probability distribution, the 4-1 and 4-2 probability distributions may have a multinomial distribution. Then, a training signal is displayed on the training image in the selected horizontal axis unit and/or vertical axis unit.

Referring to FIG. 1 again, the method for generating a training image includes a step of drawing a grid pattern on a two-dimensional plane in accordance with the grid scale selected in the step S400 (S500).

Figure 6:
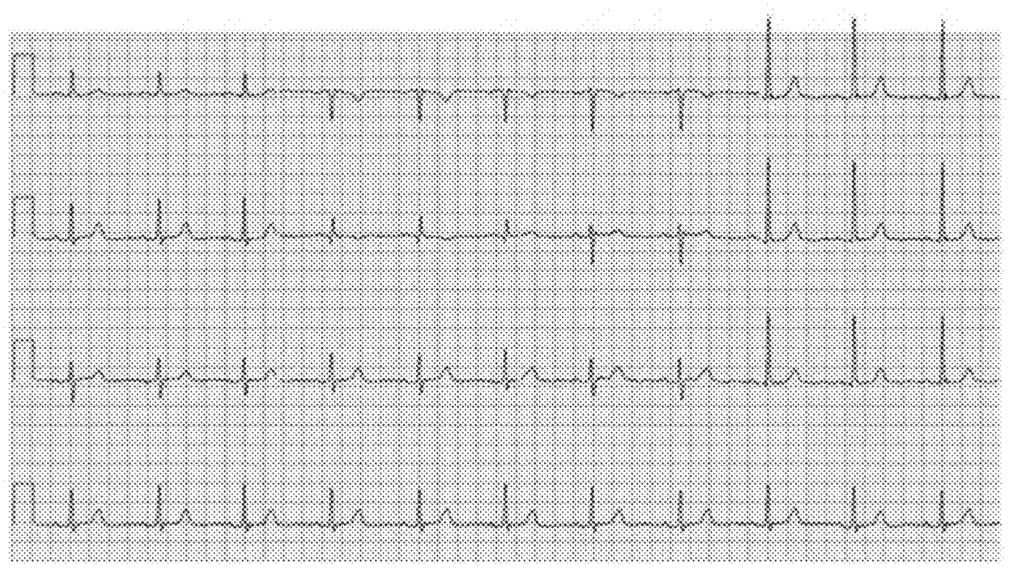
FIG. 6 shows that a grid pattern is drawn in accordance with an embodiment of the present disclosure.

FIG. 6 shows that a grid pattern is drawn in accordance with an embodiment of the present disclosure.

Referring to FIG. 6, a grid pattern according to a grid scale is a pattern in which grids are arranged in the per-axis grid scale unit determined in the step S400 (S500).

In an embodiment, the step of drawing a grid pattern on a two-dimensional plane (S500) may include a step of selecting any one grid pattern format among a plurality of preset grid pattern formats.

The grid pattern format defines a grid pattern using a unique display line hierarchy of a pattern and/or a unique display line design of a pattern. The hierarchy, for example, shows a large section, a medium section, a small section, etc.

Similar to an output format function, each of a plurality of grid pattern formats is composed of one or more pattern elements constituting the corresponding grid pattern format. Accordingly, similar to an output format function, a grid pattern format can also be expressed as a function composed of pattern elements. One or more pattern elements respectively constituting n (n is a natural number of 1 or more) grid pattern format functions ($f_n^3$) are defined and stored in advance. For reference, the subscript 'n' is a character showing that there are n functions and the superscript is a number for discriminating from other functions described above and to be described below.

In specific embodiments, a pattern vector ($P_n^3$) of the grid pattern format function ($f_n^3$) may include m factors and each of the factors is expressed as a pattern element ($p_{nm}^3$) (here, n is a grid pattern function identifier and m is an element identifier). The pattern element ($p_{nm}^2$) corresponds to a pattern component defined in the corresponding grid pattern format function.

In an embodiment, the pattern element may include the shape (various display types for drawing virtual line such as a solid line, a dotted line, and a double line), thickness, color, etc. of a marking line of a grid pattern. The color may be implemented as an RGB numerical value, a numerical value for each channel of CMYK, etc.

When a pattern element has a specific value, a pattern factor corresponding to the pattern element is implemented as the specific value in the corresponding grid pattern format and is expressed in a training image.

Similar to the output format function, the pattern elements of the grid pattern format function may be implemented as hyperparameters. When one grid pattern format function includes a plurality of pattern elements, the pattern elements can be expressed as hyperparameter vectors. In this case, vector values are the values of the pattern elements. Then, each grid pattern format function may be associated with its hyperparameter vector.

In an embodiment, the step of selecting any one grid pattern format among a plurality of grid pattern formats may select any one grid pattern format in accordance with a preset 5-1 probability distribution.

The 5-1 probability distribution defines the probability of selecting a specific grid pattern format to generate a training image among all of a plurality of grid pattern format functions. Selecting an output format function in accordance with the 5-1 probability distribution is similar to selecting transform in accordance with the 1-1 probability distribution.

In an embodiment, the 5-1 probability distribution may be defined as a manner of selecting one grid pattern format function from n pieces. For example, the 5-1 probability distribution may have a multinomial distribution.

In alternative embodiments, the 5-1 probability distribution may have been optimized by training a certain designated initial probability distribution. This will be described in more detail below.

The selected grid pattern format may be directly used or may be determined as a grid pattern format for a training image by changing the value of a pattern element of the selected grid pattern format (S500). A selected grid pattern format may receive a new value for at least one format element as an input factor, whereby the function of a grid pattern format function may be adjusted.

In an embodiment, the step of drawing a grid pattern on a two-dimensional plane may include: a step of adjusting a pattern element value of a selected grid pattern format; and a step of determining the grid pattern format having the adjusted pattern element value as a grid pattern format of the training image. Changing the value of a pattern element may be performed on the basis of a probability.

In an embodiment, a 5-2 probability distribution may be set for each pattern element. When there are m pattern elements, m 5-2 probability distributions are defined and allocated. For each of the pattern elements of a grid pattern format function selected in accordance with the 5-1 probability distribution, the existing pattern element value may be changed into a new value selected in accordance with a 5-2 probability distribution set in advance for itself. The grid pattern format having the new changed value is used to generate a training image.

The 5-2 probability distribution defines a probability distribution in which individual values will be designated in the entire range of values that pattern elements of a grid pattern format function can have. In specific embodiments, the 5-2 probability distribution may include a Gaussian probability distribution, a uniform probability distribution, a continuous uniform probability distribution, a normal distribution, a chi-squared distribution, a binomial probability distribution, and/or a multivariate probability distribution. A same 5-2 probability distribution or different 5-2 probability distributions may be set for each pattern element.

In an embodiment, when a pattern element is implemented as numerical data, the 5-2 probability distribution may be a Gaussian (normal) distribution, a gamma distribution, an exponential distribution, a uniform distribution, and a chi-squared distribution that are continuous probability distributions. Then, a new value of the pattern element is a value selected from a continuous probability distribution.

In an embodiment, when a pattern element is implemented as binary variable data, the 5-2 probability distribution may be a binomial distribution, a negative binomial distribution, a hypergeometric distribution, and a Poisson distribution that are discrete probability distributions. The binary variable data may be expressed as a second binary value indicating "yes" or a second binary value indicating "no". A new value of the pattern element is a value selected in accordance with the discrete probability distributions.

In some embodiments, a set of pattern elements constituting a grid pattern format function may include at least some pattern elements having a correlation with each other. When a pattern element changed into a new value has a correlation with another pattern element, the 5-2 probability distribution set for the another pattern element having the correlation may be a multivariate probability distribution. Then, the value of the another pattern element having the correlation is changed into a new value selected in accordance with a predefined multivariate probability distribution.

Then, a grid pattern is drawn on a two-dimensional plane in the grid pattern format obtained by adjusting the selected grid pattern format.

In alternative embodiments, the 5-2 probability distribution may have been optimized by training a certain designated initial probability distribution. This will be described in more detail below.

Referring to FIG. 1 again, the method for generating a training image include: a step of setting a reference position of the waveform content of the training signal determined in the step S300 on the basis of at least one of the output format determined in the step S200, the output section for each channel determined in the step S300, and the grid scale determined in the step S400; and a step of drawing the waveform content of the training signal and a signal marker on a two-dimensional plane with a grid pattern drawn thereon in the step S500 (S700).

The position of a training signal for each channel and the position of an output disposition structure are calculated on the two-dimensional plane forming the frame of a training image in the step S200. The content of a waveform to be displayed in a training image is determined in the step S300.

The coordinates of a measurement value for the waveform content in a training signal are calculated to fit to the grid scale determined in the step S400 (S600). The coordinates of the measurement value indicate a position on a two-dimensional plane and define the waveform content of what channel will be disposed at which position. The coordinates of the measurement value are calculated as coordinate values based on a grid pattern.

The calculated measurement value of the training signal may be used as reference coordinates of the waveform content of the training signal.

Figure 7:
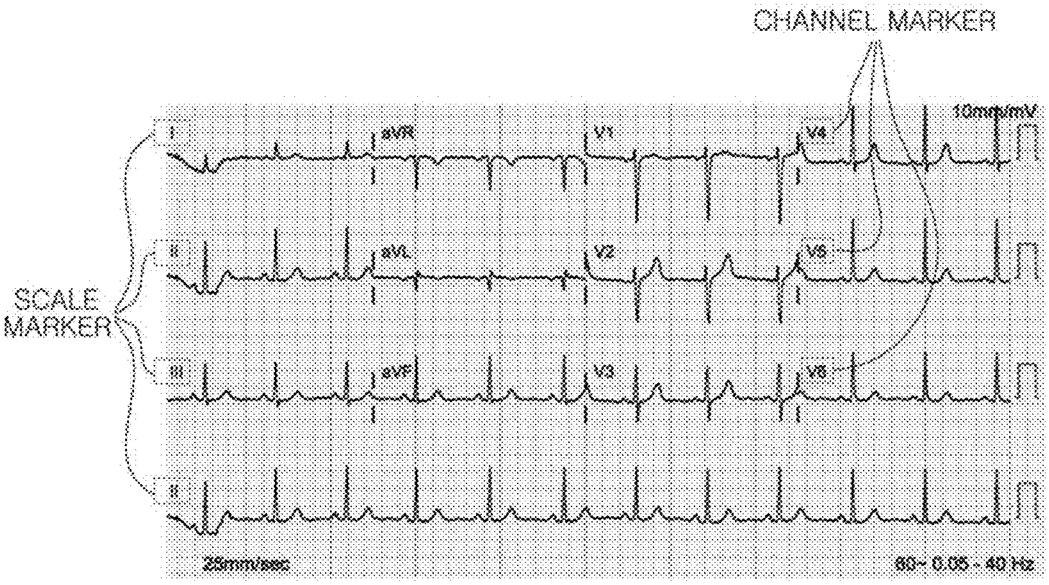
FIG. 7 is a schematic diagram of a result of drawing the waveform content of a training signal and a signal marker on a two-dimensional plane with the grid pattern drawn thereon in accordance with an embodiment of the present disclosure.

FIG. 7 is a schematic diagram of a result of drawing the waveform content of a training signal and a signal marker on a two-dimensional plane with the grid pattern drawn thereon in accordance with an embodiment of the present disclosure.

Referring to FIG. 7, the step of drawing the waveform content of the training signal and a signal maker on a two-dimensional plane with a grid pattern drawn thereon (S700) may draw a waveform content for each channel of the training signal and the signal marker on a two-dimensional plane with a pattern drawn thereon on the basis of the reference position.

In an embodiment, the step of drawing a waveform content for each channel of the training signal on a two-dimensional plane with a pattern drawn thereon on the basis of the reference position (S700) may include: a step of defining a drawing function for expressing the waveform content for each channel of a training signal as a graphic on the basis of the reference position; and a step of drawing the waveform content of the training signal and the signal marker using the defined drawing function.

The drawing function ($f_n^4$) is based on the reference coordinates of a training signal and one or more drawing vectors ($p_{nm}^4$). A drawing vector ($P_n^4$) may include m factors and each of the factors is expressed as a drawing element ($p_{nm}^4$) (here, n is a drawing function identifier and m is an element identifier). For reference, the subscript 'n' is a character showing that there are n functions and the superscript is a number for discriminating from other functions described above.

The reference coordinates of a training signal, similar to a coordinate on a horizontal axis of a signal and a coordinate on a vertical axis, may include coordinates of a measurement value of the waveform content of the training signal calculated to fit to a grid pattern.

The drawing element ($p_{nm}^4$) defines the design of a waveform and a signal marker. The drawing elements are divided into a first group relating to the design of a waveform and a second group relating to the design of a signal marker.

The drawing element of the first group may include the shape, thickness, color, etc. of a waveform. The color may be implemented as an RGB numerical value, a numerical value for each channel of CMYK, etc.

The signal marker includes a channel marker and a scale marker. The drawing element of the second group may include the position, shape, font, color, character (or line) thickness, etc. of a marker. The position of a marker is shown as a relative position from a drawn training signal.

This definition may be performed in response to user input or may be set in advance.

It may be possible to draw the waveform content of a training signal on a two-dimensional plane using the drawing function and to draw a channel marker and a scale marker within a predetermined distance from the waveform of the training signal (S700).

When the drawing element value is adjusted, the waveform content of a training signal, a channel marker, and a scale marker may be drawn on the two-dimensional plane by applying the adjusted drawing element value (S700).

In an embodiment, the step of drawing the waveform content of a training signal and a signal marker using a defined drawing function may include: a step of adjusting the value of a drawing element of the drawing function; and a step of drawing the waveform content for each channel of the training signal on a two-dimensional plane with the grid pattern drawn thereon by applying the adjusted drawing element value. Changing the value of a drawing element may be performed on the basis of a probability.

In an embodiment, a sixth probability distribution may be set for each drawing element. When there are m drawing elements, m fifth probability distributions are defined and allocated. For each of the drawing elements of a drawing function selected in accordance with the sixth probability distribution, the existing drawing element value may be changed into a new value selected in accordance with the sixth probability distribution set in advance for itself. A training image is drawn in two-dimensional plane in the drawing manner to which the new changed value has been applied.

The sixth probability distribution defines a probability distribution in which individual values will be designated in the entire range of values that drawing elements of a drawing function can have. In specific embodiments, the sixth probability distribution may include a Gaussian (normal) distribution, a uniform distribution, and a chi-squared distribution as continuous probability distributions, a binomial distribution, a negative binomial distribution, a hypergeometric distribution, and a Poisson distribution as discrete probability distributions, and a multinomial distribution and/or multivariate probability distributions for a plurality of transform elements. A same sixth probability distribution or different sixth probability distributions may be set for each drawing element. Further, other than a parametric method of extracting a drawing element with a probability distribution defined in the specific types described above, it may be possible to randomly extract a drawing element even without assuming a specific distribution.

In an embodiment, when a drawing element is implemented as numerical data, the sixth probability distribution may be a Gaussian (normal) distribution, a uniform distribution, a continuous uniform probability distribution, a normal distribution, or a chi-squared distribution that are a continuous probability distribution. Then, a new value of the drawing element is a value selected from the continuous probability distribution.

In an embodiment, when a drawing element is implemented as binary variable data, the sixth probability distribution may be a binomial distribution, a negative binomial distribution, a hypergeometric distribution, and a Poisson distribution that are discrete probability distributions. The binary variable data may be expressed as a second binary value indicating "yes" or a second binary value indicating "no". A new value of the drawing element is a value selected in accordance with the discrete probability distributions.

In an embodiment, when a drawing element is implemented as a categorical variable, the sixth probability distribution may be a multinomial probability distribution. Then, a new value of the drawing element is a value selected in accordance with the multinomial probability distribution.

In some embodiments, a set of drawing elements constituting a drawing function may include at least some drawing elements having a correlation with each other. When a drawing element changed into a new value has a correlation with another drawing element, the sixth probability distribution set for the another drawing element having the correlation may be a multivariate probability distribution. Then, the value of the another drawing element having the correlation is changed into a new value selected in accordance with a predefined multivariate probability distribution.

Then, the waveform content of a training signal and a signal marker are drawn on a two-dimensional plane in the drawing manner having a changed value (S700).

In alternative embodiments, the sixth probability distribution may have been optimized by training a certain designated initial probability distribution. This will be described in more detail below.

Further, the method for generating a training image includes a step of further drawing additional information of a training signal and/or scale information (S800).

Figure 8:
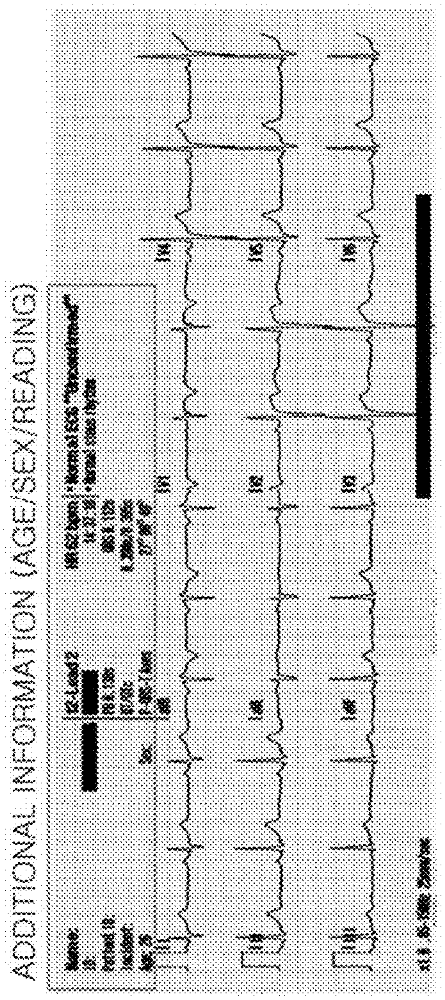
FIG. 8 is a schematic diagram showing that additional information is drawn in accordance with an embodiment of the present disclosure.

FIG. 8 is a schematic diagram showing that additional information is drawn in accordance with an embodiment of the present disclosure.

Referring to FIG. 8, the additional information of a training signal is, similar to source additional information, the original attributes of the training signal. The additional information of a training signal may be implemented as a text that refers to age, sex, a measurement place, measurement time, or waveform analysis.

In an embodiment, the step of drawing additional information of a training signal may be a step of selecting and drawing an additional information text randomly selected among preset additional information texts. The drawing positions of additional information texts are based on the output format determined in the step S300.

In some other embodiments, the additional information of a training signal may be source additional information. In this case, the additional information of a training signal and the additional information of a source signal are the same.

The scale information is information describing the grid scale determined in the step S400 and may be implemented as a symbol, a picture, and a text that indicate the grid scale. The drawing position of the scale information is also based on the output format determined in the step S200.

In an embodiment, the step of drawing scale information may include: a step of selecting any one scale drawing manner among a plurality of preset scale drawing manners; and a step of drawing the scale information in the selected scale drawing manner.

In an embodiment, the step of selecting any one scale drawing manner among a plurality of preset scale drawing manners may be selecting any one scale drawing manner from a plurality of preset scale drawing manners in accordance with a seventh probability distribution.

The seventh probability distribution may be defined as a manner of selecting one from n pieces. For example, the seventh probability distribution may have a multinomial distribution.

Further, the method for generating a training image may further include a step of additionally transforming a generated training image (S900).

The step S900 may include: a step of selecting any one image augmentation function among a plurality of preset image augmentation functions; and a step of additionally transforming the training image using the selected image augmentation function.

The image augmentation function may be composed of a plurality of augmentation elements. The augmentation elements may include the type, frequency, intensity, and/or epoch number of transform.

The step of selecting an augmentation element is similar to selecting a transform function. In an embodiment, the step of selecting an augmentation function may select any one image augmentation function among a plurality of transform functions or may select two or more image augmentation functions from a plurality of image augmentation functions, depending on an eighth probability distribution set in advance for a set of a plurality of image augmentation functions.

The eighth probability distribution defines the probability of selecting image augmentation function(s) to generate a training image among all of a plurality of image augmentation functions.

In an embodiment, the eighth probability distribution may be defined as a manner of selecting one image augmentation function from n pieces. For example, the eighth probability distribution may have a multinomial distribution.

In another embodiment, the eighth probability distribution may be defined as a manner of selecting two or more image augmentation functions from n pieces. For example, the eighth probability distribution may have a binomial distribution.

Further, the method for generating a training image may further include a step of converting data of a generated training image into a tensor of a W×H×C' type (S1000). In this case, W is the width of an image, H is the height of an image, and C' is the number of color channels (C'=1 for black and white). When a multi-channel one-dimensional signal of a C×T real number array type is input as a source signal, it may be possible to generate a training image through the method for generating a training image and output a result converted into a three-dimensional real number array of a W*h*C type.

In the alternative embodiments, a probability distribution may have been optimized by training a certain designated initial probability distribution.

As described above, a hyperparameter vector may include binomial data, multinomial data, and a numerical data.

The binomial data is selected in accordance with a binomial distribution. As described above, selection according to a binomial distribution may be performed twice or more. Label data for the binomial data is implemented as a multilabel choice that is selected as "yes" for one or more items.

The multinomial data is selected in accordance with a multinomial distribution. As described above, selection according to a multinomial distribution may be independently performed. Then, label data for the multinomial data is implemented as a single-label choice.

The numerical data is selected in accordance with a probability distribution having a limited or unlimited range. Such a probability distribution is a continuous probability distribution and may include a Gaussian (regular) distribution, a gamma distribution, an exponential distribution, a uniform distribution, a chi-squared distribution, etc. As described above, selection according to a uniform distribution is selecting a real number in a limited or unlimited range.

An element that is implemented in the data format described above corresponds to a hyperparameter of a machine learning model and may be an optimization target.

Such a hyperparameter may be optimized in the process of training an image-based artificial intelligence model that analyzes multi-channel one-dimensional signal images using a generated training image.

The hyperparameter is optimized under the following purposes: a) improvement of accuracy in a text dataset of a trained artificial intelligence, b) improvement of robustness against domain shift and adversarial attacks, and c) improvement of an embedding quality of a latent vector (i.e., distance minimization in a latent space between same concepts).

Optimizing the hyperparameter may be performed through an optimization algorithm such as Grid search, Random search, Gaussian process, and Tree-structed Parzen Estimator (TPE), but is not limited thereto.

According to another aspect of the present disclosure, the method for generating a training image may be performed by components configured to receive and process data.

Figure 9:
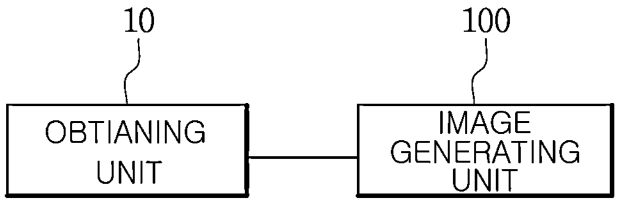
FIG. 9 is a block diagram of a device that performs the method for generating a training image in accordance with another aspect of the present disclosure.

FIG. 9 is a block diagram of a device that performs the method for generating a training image in accordance with another aspect of the present disclosure.

Referring to FIG. 9, the device includes an obtaining unit 10 and an image generating unit 100.

The obtaining unit 10 obtains a source signal from a device that can measure a source signal such as a multi-channel one-dimensional signal. For example, the obtaining unit can directly or indirectly obtain an electrocardiogram signal from ECG measuring equipment that is attached to a portion of the body of a subject and measures, for example, an electrocardiogram signal that is a multi-channel one-dimensional signal of the subject (user).

The obtaining unit 10 may be connected to receive information from ECG measuring equipment that measures an electrocardiogram signal of a subject through a sensor attached to a portion of the body of the subject. Then, the obtaining unit 10 may directly obtain the electrocardiogram signal from the ECG measuring equipment.

The sensor may be a device that is attached to a portion of the body of a subject and measures an electrocardiogram signal of the subject (user). An electrocardiogram signal obtained from a sensor and ECG measuring equipment can be converted into a digital signal through an analog-digital converter (ADC). Further, ECG measuring equipment (not shown) can measure a bio-signal when determining through a touch panel that the user's body is in contact over a predetermined time. According to another embodiment, the obtaining unit 10 can obtain not only an electrocardiogram (raw signal), but an electrocardiogram image output and visualized on a paper or an image on the basis of an obtained electrocardiogram signal.

The obtaining unit 10 may be connected to receive information from ECG measuring equipment that measures an electrocardiogram signal of a subject through a sensor attached to a portion of the body of the subject. Then, the obtaining unit 10 may directly obtain the electrocardiogram signal from the ECG measuring equipment.

Alternatively, the obtaining unit 10 may be connected with an external device to perform wired/wireless electric communication. Then, the obtaining unit 10 may obtain electrocardiogram signal data obtained or stored in advance in the external device. The external device may be connected with ECG measuring equipment or may obtain electrocardiogram signal data from another external device connected with ECG measuring equipment. Accordingly, obtaining electrocardiogram signal data from an external device by means of the obtaining unit 10 may be considered as indirectly obtaining an electrocardiogram signal.

Source signal information measured through one or more channels is obtained through the obtaining unit 10. The source signal information may include a an analog source signal, digital source signal information, or a source image showing a source signal.

The image generating unit 100 is a computing device including a processor and a memory, and may perform the steps S100 to S800 of the method for generating a training image of FIG. 1 when receiving source signal information received by the obtaining unit 10.

In an embodiment, the image generating unit 100 may be implemented as a server. The obtaining unit 10 may be a device connected to the server and inputting data (e.g., a user terminal or signal input equipment).

In this case, the server may be a plurality of computer system or computer software implemented as a network server and can configure and provide various items of information on a website. In this case, the network server means a computer system or computer software (a network server program) that is connected with a lower device, which can communicate with another network server through a computer network such as a personal intranet or the internet, receives a work request, performs the work, and provides the result of performing the work. However, other than this network server program, the network server should be understood as a broad concept including a series of applications that are operated on a network server, and depending on cases, including various database constructed inside. For example, when various databases are included, the server is configured to use external database information such as a cloud, and in this case, the server can connect to an external database server (e.g., cloud server) and perform data communication, depending on operations.

Operations by the method for generating a training image and a device performing the method according to the embodiments described above may be at least partially implemented as computer programs and may be recorded on a computer-readable recording medium. For example, the operations may be implemented with a program product implemented as a computer-readable medium including program codes and may be executed by a processor for performing some or all of the steps, operations, or processes described above.

The computer may be a desktop, a laptop, a smartphone, or a computing device that is similar thereto or may be any device integrated thereto. A computer is a device having one or more processors, memories, storage spaces, and networking components (either wireless or wired type) that are alternative and have a specific purpose. The computer can execute, for example, an operating system compatible to Windows of Microsoft or an operating system such as Apple OS X or iOS, Linux distribution, or Android OS of Google.

The computer-readable recording medium includes all kinds of recording devices that store data that can be read by a computer. The computer-readable recording medium, for example, may be a ROM, a RAM, a CD-ROM, a magnetic tape, a floppy disk, an optical data storage device, etc. Further, the computer-readable recording medium may be distributed to computer systems that are connected through a network and may store and execute codes that can be read in a distributed manner by computers. Further, functional programs, codes, and code segments for implementing the present embodiment would be easily understood by those skilled in the art.

Although the present disclosure was described above with reference to the embodiments shown in the drawings, those are only examples and it would be understood by those skilled in the art that various changes and modifications of embodiments may be achieved from the above exemplary embodiments. However, such modifications should be considered as being included in the technical protective scope of the present disclosure. Therefore, the technical protective scope of the present disclosure should be determined by the scope described in claims.

INDUSTRIAL APPLICABILITY

The present disclosure relates to a method for generating a training image used to train an image-based artificial intelligence model and a device for performing the method, and can be applied to signal analysis in various industrial fields that analyze two-dimensional images on the basis of signals in the medical/biological field or other one-dimensional signals.

What is claimed:

1. A method for generating a training image that is performed by a computing device including a processor and a memory, comprising:

generating a training signal on the basis of source signal information;

selecting at least one output format from among a plurality of preset output formats to determine an output format of the training image, wherein each of the plurality of output formats is composed of one or more format elements determining a disposition structure of the output format, and the selecting at least one output format includes selecting any one output format or selecting two or more output formats from among the plurality of output formats, depending on a probability distribution set in advance for a set of the plurality of preset output formats, wherein when one output format is selected, the probability distribution is a multinomial distribution, and when two or more output formats are selected, the probability distribution is a binomial distribution;

determining an output section for each channel of the training signal on the basis of a length of a time section of a waveform of the determined output format;

determining a grid scale of the training image by selecting a per-axis scale;

drawing a grid pattern on a two-dimensional plane in accordance with the determined grid scale;

setting a reference position of a waveform content of the training signal on the basis of at least one of the determined output section for each channel and the determined grid scale; and drawing the waveform content of the training image and a signal marker on the two-dimensional plane with the grid pattern drawn thereon.

2. The method of claim 1, wherein the generating of a training signal on the basis of source signal information includes:

selecting at least one transform function from among a plurality of preset transform functions; and transforming the source signal into a training signal using the selected transform function, and the transform function is composed of one or more transform elements indicating transforming a signal processing attribute of an input signal, and the transform elements each correspond to the signal processing attribute.

3. The method of claim 2, wherein the transforming the signal processing attribute includes processing, changing, or removing one or more of a size, a waveform, a frequency range, frequency distribution, a start point, and a time range of a signal, and the transforming the signal processing attribute is performed for each channel, performed for a channel group, or performed for all of channels.

4. The method of claim 2, wherein the selecting of at least one transform function from among a plurality of transform functions is selecting any one transform function from among a plurality of transform functions or selecting two or more transform functions from among a plurality of transform functions, depending on a 1-1 probability distribution set in advance for a set of the plurality of transform functions, when one transform function is selected from N pieces, the 1-1 probability distribution is a multinomial distribution, and when two or more transform functions are selected from N pieces, the 1-1 probability distribution is a binomial distribution.

5. The method of claim 2, wherein the transforming of the source signal into a training signal using the selected transform function includes:

changing at least one transform element value of transform elements constituting the selected transform function into a new value; and generating a signal, to which a signal attribute changed in accordance with the changed transform element value has been applied, into a training signal;

wherein the new value is a value selected in accordance with a 1-2 probability distribution set in advance for the transform element.

6. The method of claim 5, wherein when a transform element is implemented as numerical data, a new value of the transform element is a value selected in accordance with a continuous probability distribution, when a transform element is implemented as binary variable data, a new value of the transform element is a value selected in accordance with a discrete probability distribution, and when a transform element is implemented as a categorical variable, a new value of the transform element is a value selected in accordance with a multinomial probability distribution.

7. The method of claim 5, wherein a set of transform elements constituting the transform function includes at least some transform elements having a correlation with each other, and when a transform element changed into a new value has a correlation with another transform element, a value of the another transform function having the correlation is changed into a new value selected in accordance with a predefined multivariate probability distribution.

8. The method of claim 1, wherein the selecting at least one output format from a plurality of preset output formats to determine an output format of the training image includes:

changing at least one format element value of format elements constituting the selected output format into a new value; and determining an output format having the changed format element value as an output format of the training image, the new value is a value selected in accordance with a 2-2 probability distribution set in advance for the format element.

9. The method of claim 8, wherein when a format element is implemented as numerical data, a new value of the format element is a value selected in accordance with a continuous probability distribution, when a format element is implemented as binary variable data, a new value of the format element is a value selected in accordance with a discrete probability distribution, and when a format element is implemented as a categorical variable, a new value of the format element is a value selected in accordance with a multinomial probability distribution.

10. The method of claim 8, wherein a set of format elements constituting the output format includes at least some format elements having a correlation with each other, and when a format element changed into a new value has a correlation with another format element, a value of the another format element having the correlation is changed into a new value selected in accordance with a predefined multivariate probability distribution.

11. The method of claim 1, wherein the determining of an output section for each channel of the training signal on the basis of a length of a time section of a waveform of the determined output format includes:

selecting at least one point from a start point and an end point of an output section for each channel to be output on the training image of an entire length of a received source signal; and calculating the section for each channel on the basis of the length of a time section of a waveform of format elements of a selected output format and the selected point.

12. The method of claim 11, wherein the start point or the end point is a point selected in accordance with a preset third probability distribution from a selection range of each point, the third probability distribution defines a probability distribution in which an individual value will be designated in a selection range for each of the start point and the end point, the selection range of the start point is a range from a first point of a training signal to a point extending from a final point of the training signal in a negative time direction by a time section of a determined waveform, and the selection range of the end point is a range from a final point of a training signal to a point extending from a first point of the training signal in a positive time direction by the time section of the determined waveform.

13. The method of claim 1, wherein the determining of a grid scale of the training image includes:

selecting any one horizontal axis unit scale from a plurality of horizontal axis unit scale in accordance with a 4-1 probability distribution set in advance for all of a plurality of preset horizontal axis unit scales; or selecting any one vertical axis unit scale from a plurality of vertical axis unit scale in accordance with a 4-2 probability distribution set in advance for all of a plurality of preset vertical axis unit scales, and the 4-1 and 4-2 probability distributions have a multinomial distribution.

14. The method of claim 1, wherein the drawing of a grid pattern on a two-dimensional plane in accordance with the determined grid scale includes selecting any one grid pattern format from a plurality of grid pattern formats in accordance with a 5-1 probability distribution set in advance for a set of the plurality of preset grid pattern formats, and the 5-1 probability distribution is a multinomial distribution.

15. The method of claim 14, wherein the drawing of a grid pattern on a two-dimensional plane in accordance with the determined grid scale includes:

adjusting a pattern element value of a selected grid pattern format; and determining a grid pattern format having the adjusted pattern element value as a grid pattern format of the training image, the plurality of grid pattern formats is each composed of one or more pattern elements that define a grid pattern as a display line hierarchy of a pattern or a unique display line design of a pattern, and the adjusted value is a value selected in accordance with a 5-2 probability distribution set in advance for the format element.

16. The method of claim 15, wherein when a format element is implemented as numerical data, an adjusted value of the format element is a value selected in accordance with a continuous probability distribution, and when a pattern element is implemented as binary variable data, an adjusted value of the pattern element is a value selected in accordance with a discrete probability distribution.

17. The method of claim 15, wherein a set of pattern elements constituting the grid pattern format includes at least some pattern elements having a correlation with each other, and when a pattern element adjusted into a new value has a correlation with another pattern element, a value of the another pattern element having the correlation is adjusted into a new value selected in accordance with a predefined multivariate probability distribution.

18. The method of claim 1, wherein a reference position of the waveform content of the training signal includes coordinates of a measurement value of the training signal that are calculated as coordinate values based on the grid pattern.

19. The method of claim 1, wherein the drawing of the waveform content of the training image and a signal marker on the two-dimensional plane with the grid pattern drawn thereon includes:

defining a drawing function for drawing the waveform content of the training signal for each channel as a graphic on the basis of a reference position; and drawing the waveform content of the training signal and the signal marker using the defined drawing function, and the drawing function is based on reference coordinates of a training signal and one or more drawing elements, and the drawing element defines a design of a waveform or a design of a signal marker.

20. The method of claim 19, wherein the drawing of the waveform content of the training signal and the signal marker using the defined drawing function includes:

adjusting a value of a drawing element of the drawing function; and drawing the waveform content of the training signal for each channel on a two-dimensional plane with the grid pattern drawn thereon by applying the adjusted drawing element value, the adjusted value is a value selected in accordance with a sixth probability distribution set in advance for the drawing element.

21. The method of claim 20, wherein when a drawing element is implemented as numerical data, an adjusted value of the drawing element is a value selected in accordance with a continuous probability distribution, when a drawing element is implemented as binary variable data, an adjusted value of the drawing element is a value selected in accordance with a discrete probability distribution, and when a drawing element is implemented as categorical variable data, an adjusted value of the drawing element is a value selected in accordance with a multinomial probability distribution.

22. The method of claim 20, wherein a set of drawing elements constituting the drawing function includes at least some drawing elements having a correlation with each other, and when a drawing element adjusted into a new value has a correlation with another drawing element, a value of the another drawing element having the correlation is adjusted into a new value selected in accordance with a predefined multivariate probability distribution.

23. The method of claim 1, wherein the method is used to train an image-based artificial intelligence model analyzing images obtained from multi-channel one-dimensional signals.

24. A non-transitory computer-readable recording medium storing computer program combined with hardware to perform the method for generating a training image of claim 1.

25. A device for generating a training image, comprising:

an obtaining unit configured to obtain a source signal; and an image generating unit including a processor and a memory, wherein the image generating unit receives source signal information received by the obtaining unit and performs the method for generating a training image of claim 1.

* * * * *